Oct. 25, 1966  L. E. SAUER  3,280,682
ARCUATE FACED CUTTING RULE AND METHOD OF MAKING SAME
Original Filed May 8, 1961  2 Sheets-Sheet 1
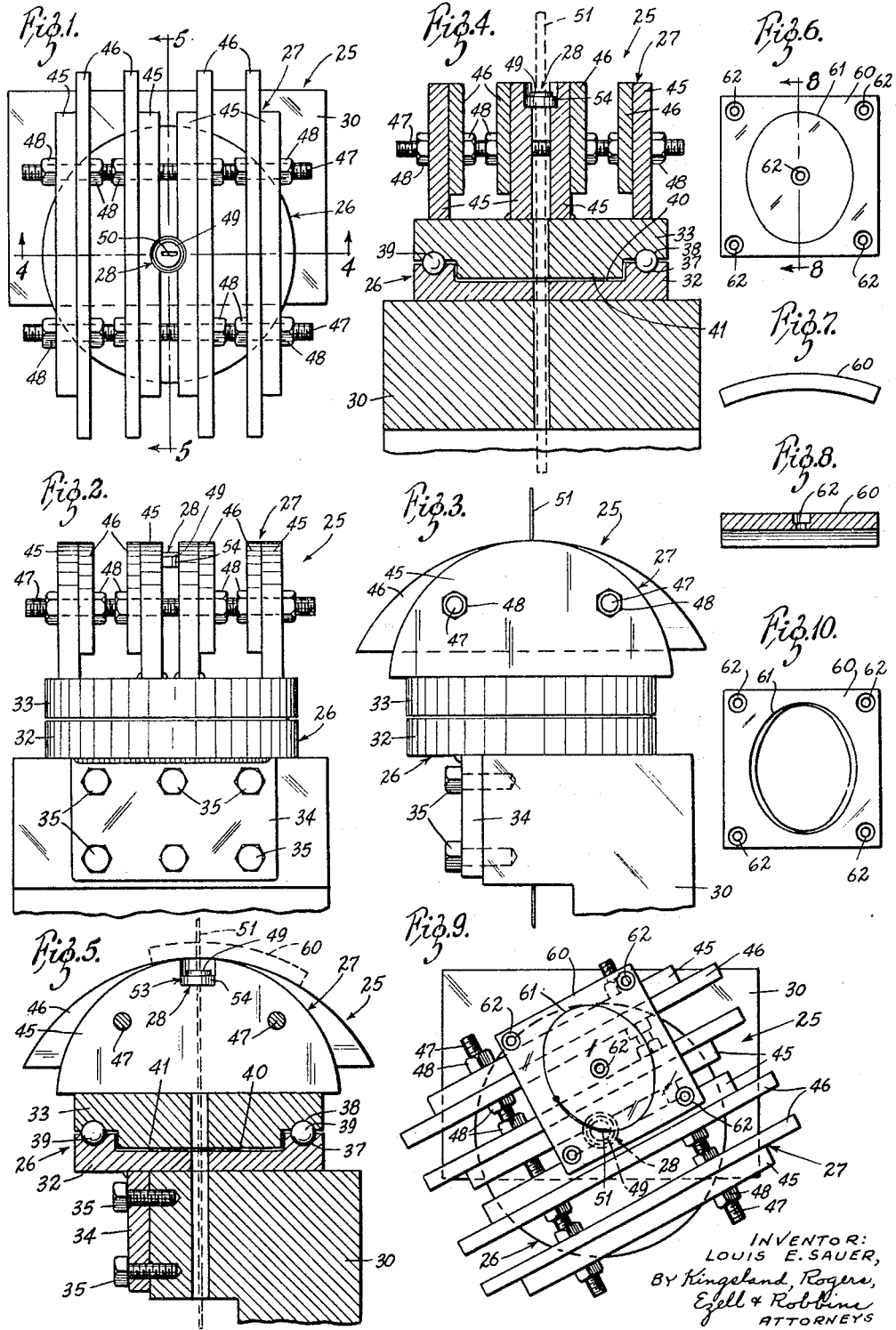

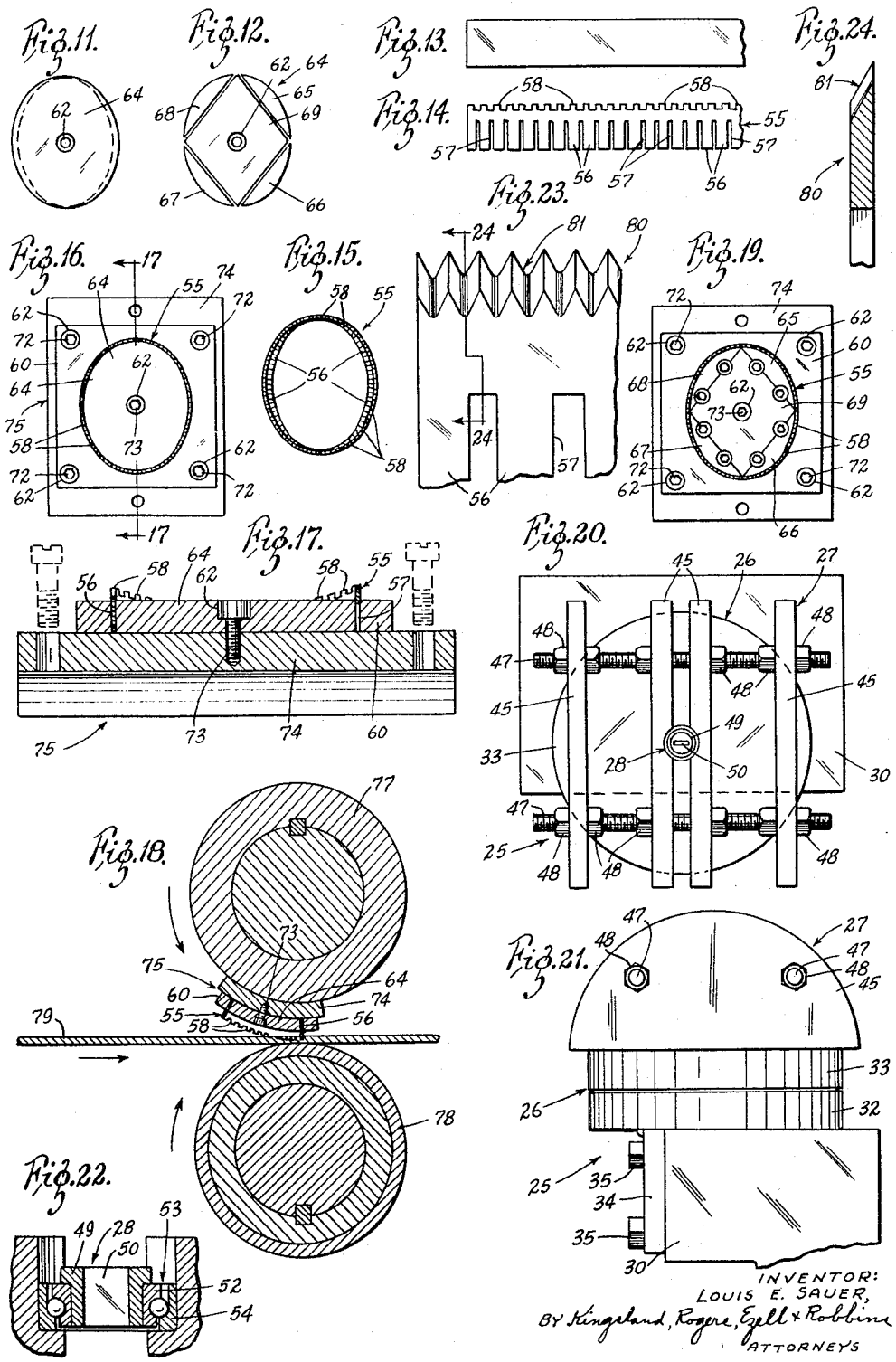

United States Patent Office 3,280,682
Patented Oct. 25, 1966

3,280,682
ARCUATE FACED CUTTING RULE AND
METHOD OF MAKING SAME
Louis E. Sauer, St. Louis, Mo., assignor to L. E. Sauer
Machine Company, St. Louis, Mo., a corporation of
Missouri
Continuation of application Ser. No. 108,484, May 8,
1961. This application Oct. 21, 1965, Ser. No. 499,578
7 Claims. (Cl. 83—347)

The present application is a continuation of applicant's copending application Serial No. 108,484, filed May 8, 1961, now abandoned.

The present invention relates generally to the art of rotary cutting, indenting or marking of cardboard material, and the like, and more particularly to a novel method of and apparatus for making a cutting, indenting, or marking rule retainer for mounting upon a cylinder, to a novel cutting, indenting or marking rule retainer, and to a novel cutting, indenting or marking rule.

There has long existed in the rotary cutting, indenting, or marking art the need of an effective method of and apparatus for forming a cutting, indenting or marking rule retainer which is particularly adapted to hold an inexpensive and simple cutting, indenting or marking rule formed to any effective cutting, indenting or marking configuration. Such a rule can be made in straight, flat strips with a uniform height and with various types of cutting, indenting, or marking edges, as desired. It is highly desirable that these rule edges require no further machining after placing in the rule retainer, thus reducing their cost. To achieve this end, it is essential that the rule retainer be adapted to hold the rule in any cutting, indenting or marking configuration with all operative portions thereof radially disposed in respect to the cylinder on which the retainer is secured in operative position.

There is no problem in respect to flat die cutting. Nor is the problem too difficult in rotary cutting, indenting or marking when the lines to be cut, indented or marked are parallel to the centerline of the cylinder, or are ninety degrees to the centerline of the cylinder.

However, a different situation obtains in respect to mounting rotary cutting, indenting or marking rules for arcuate lines, since it is very costly to form a retainer which will dispose these rules in the essential positions at all times radial with the cylinder on which the rules are mounted, by means other than those incorporated in this invention.

Therefore, an object of the present invention is to provide a novel method of and apparatus for making an arcuate-faced retainer for holding cutting, indenting, or marking rules in arcuate configurations for use mounted on cylinders which resolve the longstanding aforesaid problem.

In brief, the present novel apparatus for making an arcuate-faced retainer for holding cutting, indenting or marking rules in arcuate configuration for use mounted on cylinders comprises a base including an upper portion rotatably mounted in respect to a lower portion, laterally spaced workpiece supporting elements mounted on the upper portion of the base having upper cylindrical surfaces and including means for varying the cylindrical surface to accommodate workpieces of selected radii, and a guiding element adjacent the uppermost surface of the workpiece supporting elements adapted to receive the blade of a bandsaw, or the like, therethrough in guiding relation adjacent and beneath the point of cutting. The novel method includes disposing the workpiece at all times in relation to the cutting blade so that the workpiece is severed in a plane radial with the cylinder on which it is eventually to be mounted for operative diecutting use.

Therefore, another object is to provide a novel apparatus for making an arcuate-faced retainer for holding cutting rules, as aforesaid, which is accurate, simple to employ for maximum results, relatively inexpensive as compared to existing apparatus, and is readily adjustable in respect to handling workpieces of different radii.

Another object is to provide a novel method of making an arcuate-faced retainer for holding cutting rules, as aforesaid, which is efficient and effective to obtain accurate positioning of cutting rules in arcuate configuration for use mounted on cylinders.

Another object is to provide a novel apparatus for making an arcuate-faced retainer for holding cutting rules, as aforesaid, which is adapted to be used effectively with a bandsaw, jigsaw, or the like, for supporting a workpiece in a position to be cut thereby to provide edges of the desired arcuate or other configuration, which are radial in respect to the cylinder upon which the workpiece is employed.

Other objects of the present invention are to provide a novel method of and apparatus for making an arcuate-faced retainer for holding cutting rules, as aforesaid, which simplify the heretofore complex operations involved in attempting to provide a retainer as desired, which render the use in a particular factory of a number of separate designs both feasible and relatively inexpensive, and which otherwise fulfill the objects and advantages sought therefor.

The foregoing and other objects and advantages are apparent from the following description taken with the accompanying drawings, in which:

FIGURE 1 is a top plan view of an apparatus for making an arcuate-faced retainer for holding cutting rules in arcuate configurations for use mounted on cylinders, incorporating the teachings of the present invention;

FIGURE 2 is a side elevational view thereof looking parallel with the workpiece supporting elements;

FIGURE 3 is a side elevational view at 90° with FIGURE 2;

FIGURE 4 is a vertical central cross-sectional view taken on substantially the line 4—4 of FIGURE 1;

FIGURE 5 is a vertical cross-sectional view taken on substantially the line 5—5 of FIGURE 1;

FIGURE 6 is a top plan view of a workpiece of arcuate cross-section with a circle marked for cutting upon the apparatus of FIGURES 1–5;

FIGURE 7 is a side elevational view thereof looking upwardly towards the bottom of FIGURE 6;

FIGURE 8 is a cross-sectional view taken on substantially the line 8—8 of FIGURE 6;

FIGURE 9 is the top plan view of the present apparatus with the workpiece of FIGURE 6 disposed thereon in cutting relation with a bandsaw blade;

FIGURE 10 is a top plan view of the workpiece of FIGURE 6 with the circular portion severed therefrom;

FIGURE 11 is a top plan view of the severed central segment of the workpiece of FIGURE 6;

FIGURE 12 is a top plan view of a central segment similar to that of FIGURE 11 cut into segments for purposes of securely mounting a segmental cutting rule of overall circular configuration;

FIGURE 13 is a segment of flat material from which a cutting rule is made;

FIGURE 14 is a segment of flat cutting rule with a cutting edge for perforating cardboard, or the like;

FIGURE 15 is a view of a cutting rule formed into the proper shape to fit the opening in FIGURE 10, the adjacent ends being welded;

FIGURE 16 is a plan view of the workpiece mounted upon an arcuate support having the cutting rule of FIGURE 15 mounted in position;

FIGURE 17 is an enlarged cross-sectional view taken on substantially the line 17—17 of FIGURE 16;

FIGURE 18 is a diagrammatic cross-sectional view through a pair of cylinders on one of which the assembly of FIGURE 16 is operatively mounted, a cardboard being shown as passing therethrough for perforation by the cutting rule of FIGURE 15;

FIGURE 19 is a view similar to FIGURE 16, illustrating the central disc as segmented;

FIGURE 20 is a top plan view of the apparatus of FIGURE 1 with the workpiece supporting elements of greater radius removed;

FIGURE 21 is a side elevational view thereof;

FIGURE 22 is an enlarged vertical cross-sectional view through a rotatable saw blade guide;

FIGURE 23 is an enlarged fragmentary view of a cutting rule adapted to cut continuous lines in corrugated paper board, and the like; and FIGURE 24 is a cross-sectional view taken on substantially the line 24—24 of FIGURE 23.

Referring to the drawings more particularly by reference numerals, 25 indicates generally an apparatus for making an arcuate-faced retainer for holding cutting rules, as aforesaid, which incorporates the teachings of the present invention. The apparatus 25 includes a base assembly 26, a workpiece supporting assembly 27, and a saw blade guide 28. In the drawings, the assembly 26 is shown bolted to the platform 30 forming part of a band saw.

The base assembly 26 includes a lower base portion 32 and an upper base portion 33. A mounting bar 34 is welded to the bottom of the lower base portion 32 and extends downward therefrom, including suitable spaced apertures for receiving mounting bolts 35 by means of which the apparatus 25 is secured to the platform 30, as illustrated. Opposed annular grooves 37 and 38 are formed in the lower end upper base portions 32 and 33, respectively, which receive ball bearings 39. A central annular well 40 is formed in the lower base portion 32 into which extends a central annular boss 41 formed integrally with the bottom of the upper portion 33, as is clear from FIGURES 4 and 5. In operative disposition of the apparatus 25 upon the table 30, the upper base portion 33 rests upon the bearings 39 and is maintained in position by the weight thereof and by the weight of the superimposed workpiece supporting assembly 27. Centrally or peripherally located means can be provided to retain the upper base portion 33 against removal from the lower base portion 32 while permitting relative rotation, if desired.

The workpiece supporting assembly 27 includes four workpiece supporting elements 45 and four workpiece supporting elements 46, said elements 45 and 46 being laterally spaced as illustrated. Each element 45 and 46 comprises a portion of a disc, the latter being of greater radius than the former, as is clear from FIGURE 5. The two inner elements 45 are welded to the upper surface of the upper base portion 33. Mounted in the two inner elements 45 are two threaded shafts 47. The outer elements 45 and the elements 46 are maintained in selected spaced relation on the shafts 47 by suitable nuts 48, as is clear from the drawings. The outer elements 45 and the elements 46 are removable. As is shown in FIGURES 20 and 21, the elements 46 may be removed when it is desired to saw a workpiece having a radius equal to that of the elements 45. Obviously, elements 46 of increasingly greater radius can be employed, as desired. When the elements 45 are welded, as shown, it is desirable to select elements of the shortest radius of workpiece with which the apparatus 25 is to be employed. Manifestly, if preferred, the inner elements 45 may be removably mounted on the upper base portion 33, as by bolts and brackets, or the like.

The saw blade guide 28 is mounted on and between the inner elements 45, as is clear from FIGURES 4, 5 and 22. The guide 28 includes a member 49 having a central slot 50 through which a continuous bandsaw blade 51, or the like, is threaded. The member 49 is secured to the inner race 52 of a ball bearing assembly 53, the outer race 54 being secured in niches in the inner elements 45. The guide 28 supports the blade 51 adjacent the bottom of a workpiece in cooperation with the bandsaw head (not shown), which will be lowered into adjacent relationship to the top of the workpiece, which insures accuracy in cutting the workpiece.

In FIGURE 14, there is illustrated a cutting rule 55 adapted for use in connection with the present invention, which comprises a plurality of equally spaced fingers 56 spaced by slots 57 forming one edge and a plurality of sharp teeth 58 forming a perforating edge. In FIGURE 16, the cutting rule 55 is formed to fit into the opening of FIGURE 10. A straight segment as in FIGURE 14 is manually fitted into the opening of FIGURE 10 by the use of a plastic headed hammer, the metal yielding to properly directed blows. The adjacent ends are welded and the cutting portion is heat treated to harden.

A workpiece 60, which is adapted to be cut to provide a cutting rule retainer, is shown in FIGURES 6–8 and comprises an arcuate block of metal, preferably aluminum, or the like. For purposes of illustration, the workpiece 60 is an arcuate block having a radius equivalent to that of the elements 46, as a clear from FIGURE 5. The workpiece 60 is marked at 61 for cutting a circle, and includes a plurality of openings 62. To accomplish the marking 61, a circle is drawn on a sheet of thin metal and cut out with shears. This disc is wrapped against the convex surface of the workpiece 60 and the disc outline marked on the convex surface of the workpiece 60. Similarly, any other design can be applied to the workpiece 60.

In FIGURES 5 and 9, the workpiece 60 is shown in position on the apparatus 25, the bandsaw blade 51 in the latter figure having traversed a portion of the marking 61. In FIGURE 10, the workpiece 60 is shown with the center piece 64 cut therefrom, the piece 64 being illustrated in FIGURE 11 as unitary and in FIGURE 12 as cut into five segments 65, 66, 67, 68 and 69.

In FIGURES 16 and 17, the cutting rule 55 is shown mounted between the center piece 64 and the base portion of the workpiece 60, these workpiece elements being secured by four corner bolts 72 and a central bolt 73 to a support 74, which together form a cutting rule retainer 75.

In operative use, the retainer 75 and the retained cutting rule 55 are mounted by means of suitable bolts on the outer surface of a cylinder 77 disposed in opposed operating relation with a compression cylinder 78, preferably having a rubber, or the like, surface. A carton 79, or the like, is shown passing between the cylinders 77 and 78 and being perforated by the cutting rule 55.

In FIGURE 12, the piece 64 of the workpiece 60 is shown cut into five segments 65–69, which is necessary for firmly holding the cutting rule 55 when it is segmental, traces complex lines, is a large circle, and the like.

In FIGURES 23 and 24 is shown a segment of cutting rule 80 having a saw tooth cutting edge 81 formed as illustrated. This saw tooth cutting edge 81 is essential for rotary cutting unbroken lines, since it eliminates crushing of corrugated board which occurs when a straight cutting edge is employed.

From the foregoing, it is clear that the workpiece 60 can be cut while supported on the apparatus 25 to provide severed edges of any selected arcuate or other configuration that are constantly on the radius of the selected supporting elements 45, 46, or the like. The workpiece 60 may be moved in respect to the saw blade 51 to follow any configuration, such as the marking 61, since the supporting elements for the workpiece 60 are rotatable about the saw blade 51 and the workpiece 60 may be moved transversely and longitudinally of the supporting elements 45 or 46. The effect is universal movement of the workpiece 60 in relation to maintaining the same in position for radial cutting.

As stated above, the radius as desired is selective with the apparatus 25, since the elements 46 shown are removable and may be replaced with elements of other radii. Workpieces of any desired pattern may be readily cut upon the apparatus 25. It is also clear that it is a simple matter to change retainers 75 on the cylinder 77. Hence, the present invention reduces to a minimum delay or down time occasioned by change of cutting rule necessitated by change in carton, or the like, being perforated, scored, or cut.

It is apparent that there has been provided a novel method of and apparatus for making an arcuate-faced retainer for holding cutting rules in arcuate configurations for use mounted on cylinders, and that a novel retainer and cutting rule have likewise been provided.

It is to be understood that the foregoing description and the accompanying drawings have been given by way of illustration and example. It is also to be understood that changes in form of the several parts, substitution of equivalent elements or steps, and rearrangement of parts or steps, which will be readily apparent to one skilled in the art, are contemplated as within the scope of the present invention, which is limited only by the claims which follow.

What is claimed is:

1. In a method of forming a die rule and die rule mounting for a rotating die cutter element the steps of providing a primary base conforming to the peripheral curvature of rotation of said element, forming a slit through said primary base conforming to the contour of the die rule, pressing the die rule into the slit so that the cutting edges of the die rule protrude from the convex face of said primary base, and mounting said primary base on a curved second base adapted to be secured to said rotating element.

2. In a method of forming a die rule mounting for a rotating die cutter element, the steps of providing a primary base curved to conform to the peripheral curvature of rotation of said element, cutting a slit through the primary base of substantially the same width as the thickness of the material of a die rule to be provided, thereby cutting out a plug from said primary base, fitting a piece of die rule into the opening and shaping it to conform thereto, positioning the preformed and prebent die rule in the slit, forcing the plug severed by said slit into said die rule so as to hold said die rule in place, and mounting said primary base on a curved second base adapted to be secured to a rotating element.

3. The method of claim 2 in which the step of cutting a slit includes cutting a continuous slit, and in which the preformed and prebent die rule is welded to close the ends and is hardened by heat treating after forming.

4. In a die rule mounting for the rotating element of a die cutting device, a primary mounting block of arcuate cross section conforming to a part of a cylinder about the axis of rotation of said rotating element, a die rule formed of a strip of metal with a longitudinal cutting edge and an opposite base edge preformed into the shape to be cut and prebent to the curvature of said arcuate cross section of said primary mounting block and positioned in said block, said primary mounting block having a continuous slit cut therethrough in the shape of said die rule and of about the width of the thickness of said die rule strip of metal, and a plug formed by said continuous slit being driven into its original position within said continuous slit to hold said die rule in position.

5. A die section for mounting upon the curved surface of a roller to form with the latter a rotary die cutting device, comprising in combination, a base assembly having an undersurface contoured to the shape of the roller surface upon which it is to be mounted, said base assembly including a base element and at least a forming block cut therefrom in such manner that when placed in originally integral position at least some of the edges thereof define with the facing edges of the base element a channel in the shape of the pattern which it is desired to cut with the die section, at least a cutting element fixedly detachably secured to the pattern channel forming edges of said forming block and so shaped to fit snugly into the pattern channel when the forming block is placed in originally integral position with the cutting edges of the cutting elements extending above the upper surface of the base assembly, said cutting element being aligned to form the complete die pattern, means effective to lock said forming block and cutting element to said base element to form a unitary base assembly, and means for securing said base assembly as a unit to the roller upon which it is to be mounted.

6. A die section as defined in claim 5 wherein the contour of the base assembly undersurface is that of a cylindrical surface, and the cutting element lies in radial planes intersecting the axis of rotation of the roller to which the die section is mounted.

7. A die assembly as defined in claim 5 wherein the cutting edges of said cutting element extending above the upper surface of the base assembly lie in a surface substantially concentric with the undersurface of the base assembly.

References Cited by the Examiner

UNITED STATES PATENTS

| | | | |
|---|---|---|---|
| 922,926 | 5/1909 | Lynch | 76—107 |
| 937,331 | 10/1909 | Reed | 83—663 |
| 1,114,384 | 10/1914 | Prime | 76—107 |
| 1,428,952 | 9/1922 | Fuhr | 93—58.2 |
| 1,542,879 | 6/1925 | Hires | 83—663 |
| 1,592,094 | 7/1926 | Funk | 93—58.2 |
| 1,624,920 | 4/1927 | Braden | 76—107 |
| 2,302,855 | 11/1942 | Hallman | 83—346 |
| 2,863,337 | 12/1958 | Ackley | 83—698 |
| 3,119,312 | 1/1964 | Henc | 93—58.2 |
| 3,170,358 | 2/1965 | Martin | 83—673 |
| 3,188,900 | 6/1965 | Mauro | 83—663 |

FOREIGN PATENTS 583,351  9/1933  Germany.

WILLIAM W. DYER, JR., *Primary Examiner.*

L. B. TAYLOR, *Assistant Examiner.*